(12) United States Patent
James

(10) Patent No.: US 6,997,551 B2
(45) Date of Patent: Feb. 14, 2006

(54) SNAP-ON, FLIP-UP PAIR OF EYEGLASSES FOR MOUNTING OVER AND MODIFYING A CONVENTIONAL PAIR OF EYEGLASSES

(76) Inventor: Melody James, 601 E. 18th St., #208, Brooklyn, NY (US) 11226

( * ) Notice: Subject to any disclaimer, the term of this patent is extended or adjusted under 35 U.S.C. 154(b) by 0 days.

(21) Appl. No.: 10/886,127

(22) Filed: Jul. 8, 2004

(65) Prior Publication Data

US 2006/0007388 A1    Jan. 12, 2006

(51) Int. Cl.
*G02C 9/00*    (2006.01)
(52) U.S. Cl. .......................................... 351/47; 351/57
(58) Field of Classification Search .................. 351/47, 351/48, 57, 58, 44, 41, 136
See application file for complete search history.

(56) References Cited

U.S. PATENT DOCUMENTS

| | | | | |
|---|---|---|---|---|
| 2,714,717 A | * | 8/1955 | Allman | 2/13 |
| 4,534,627 A | * | 8/1985 | Vosper | 351/47 |
| 4,955,707 A | * | 9/1990 | Gazeley | 351/47 |
| 5,118,178 A | * | 6/1992 | Tuckman | 351/57 |
| 6,869,180 B1 | * | 3/2005 | Kidouchim | 351/47 |

* cited by examiner

*Primary Examiner*—Hung Xuan Dang

(57) ABSTRACT

A snap-on, flip-up pair of eyeglasses mounting over and modifying a conventional pair of eyeglasses. A pair of lenses are engaged by a frame having a bridge and mounting apparatus snap-on and flip-up mounts the frame over the conventional pair of glasses, while maintaining the snap-on, flip-up pair of eyeglasses a sufficient distance from the conventional pair of eyeglasses to prevent damage therebetween when the snap-on, flip-up pair of eyeglasses is snapped on/off or flipped up/down. The mounting apparatus includes a pair of arms extending rearwardly from the bridge of the frame and terminating in a pair of fingers that depend therefrom and which are spaced-apart from each other so as to form a resilient space therebetween that snappingly receives the bridge of the conventional pair of eyeglasses so as to allow the snap-on, flip-up pair of eyeglasses to snap-on/off and flip-up/down over the conventional pair of eyeglasses.

8 Claims, 2 Drawing Sheets

SNAP-ON, FLIP-UP PAIR OF EYEGLASSES FOR MOUNTING OVER AND MODIFYING A CONVENTIONAL PAIR OF EYEGLASSES

BACKGROUND OF THE INVENTION

1. Field of the Invention

The present invention relates to a pair of eyeglasses for mounting over and modifying a conventional pair of eyeglasses, and, more particularly, the present invention relates to a snap-on, flip-up pair of eyeglasses for mounting over and modifying a conventional pair of eyeglasses.

2. Description of the Prior Art

Nearly all individuals whose occupations or hobbies involve large amounts of reading or other close work will, at some point in their lives, require corrective lenses to combat blurred vision, headaches, tired eyes, and other symptoms of eyestrain. Severely nearsighted, or myopic, and farsighted, or hyperopic, individuals typically begin to wear such lenses at a relatively young age, and require more and more correction as they get older.

Even emmetropes, individuals who have "perfect 20/20" vision, may eventually become nearsighted or experience headaches, blurred vision and the like as a result of excessive close work. These individuals typically overcome their difficulties by wearing "reading" glasses-single focus lenses, the prescription for which is based on a working distance of 406.4 mm (16 inches). Such glasses are usually only worn for close work, and are removed while the individual engages in long or intermediate range activities.

Numerous innovations for eyeglasses have been provided in the prior art that will be described. Even though these innovations may be suitable for the specific individual purposes to which they address, however, they differ from the present invention.

FOR EXAMPLE, U.S. Pat. No. 4,511,226 to Freeman teaches a pair of rotatably attached auxiliary eyeglasses in combination with a pair of standard wire-framed eyeglasses. The auxiliary eyeglasses are attached to the standard eyeglasses by a connecting mechanism of a sleeve circumferentially and rotatably surrounding a wire bar. Auxiliary eyeglasses are fastened to the wire bar and may be rotated down over the conventional eyeglasses or flipped up and out of the wearer's vision. The auxiliary eyeglasses are held in the "up" position by a detent on the center of the sleeve which frictionally snaps over a resilient crosswire on the auxiliary eyeglasses and then prevents the auxiliary eyeglasses from slipping back down over the conventional eyeglasses.

ANOTHER EXAMPLE, U.S. Pat. No. 5,118,178 to Tuckman teaches corrective lenses for allowing an individual to clearly view material located at or above eye level, and a distance of approximately 508 mm (20 inches) to approximately 635 mm (25 inches) away. In a first embodiment of the invention, the lenses are in the form of snap-on, flip-up modifying lenses for mounting over the fixed lenses of a conventional pair of eyeglasses. When in the flipped-down position, the modifying lenses cover slightly more than the upper half of the fixed lenses, and the optical center of each modifying lens is horizontally and vertically aligned with the optical center of the corresponding fixed lens. In a second embodiment of the invention, designed for individuals who don't ordinarily wear glasses, the lenses are fixed within a conventional eyeglass frame. The height of the lenses is slightly more than half the height of conventional glasses, so that only the upper portion of a wearer's field of vision is covered.

STILL ANOTHER EXAMPLE, U.S. Pat. No. 5,123,724 to Salk teaches a clip-on accessory for positioning auxiliary optical elements in front of the lenses of eyeglass that can be easily assembled to custom fit eyeglasses having any of a variety of different sizes and configurations. An outline of the lens regions of the particular pair of eyeglasses is prepared and two initially oversized optical elements are trimmed to conform with the outline. Upper and lower eyeglass engaging claps are secured to each element and ends of a resilient bridge member are inserted into passages in each upper clasp. At least one upper clasp and the optical element to which it is fastened is slid along the bridge member to space the elements apart a distance corresponding to the spacing of the eyeglass lens regions. The upper clasps are then secured to the bridge member and end portions of the bridge member that protrude from the upper claps are cut off.

YET ANOTHER EXAMPLE, U.S. Pat. No. 6,027,214 to Graham teaches a lens assembly that modifies the visual correction provided by a pair of base eyeglasses, in some fashion, when it is quickly, conveniently and detachably mounted to the base eyeglasses. The lens assembly uses a clip-on, magnetic or other detachable mounting arrangement. The lens assembly may incorporate corrective lenses provided in various placements for applications such as specialized occupational applications.

STILL YET ANOTHER EXAMPLE, U.S. Pat. No. 6,170,952 to La Haye teaches a magnifying and/or corrective lens or optical element that may be removably adhered to a piano lens, such as the pane of a pair of spectacles or sunglasses, without the use of a mechanical retention device or other mechanical means for retention. The lenses are injection-molded from an aliphatic thermoplastic polyurethane, and capable of conforming to a variety of surface shapes and of adhering via tactile interactions to a piano lens without the use of an adhesive. The lenses may be securely but releasably secured to the surface of a piano lens by finger pressure alone due to their inherent molecular surface-adhesion characteristics to readily create magnifying or corrective lenses, or to modify the magnification or correction of a pair of sunglasses or piano eyeglasses. The lens of the present invention has at least one curved surface and a refractive index such that the curved surface and the refractive index cooperatively produce a nominal magnifying power. It is also directed to a pair of spectacles that comprise a magnifying and/or corrective lens securely adhered to a pane of a pair of spectacles without the use of a mechanical retention device.

YET STILL ANOTHER EXAMPLE, U.S. Pat. No. 6,244,705 to Ledbetter teaches auxiliary "task-distance" eyeglasses for use with conventional corrective eyeglasses to eliminate the constant head tilting otherwise necessary to maintain focus when using only the conventional lenses. The auxiliary glasses have upper partial lenses that correct mid-range vision, the focal length required for viewing a computer screen, reading piano music, viewing an instrument panel, or any other arms' length task. The zone of mid-range correction extends across the full width of the lenses. The lenses of the auxiliary glasses are connected by a bridge and supported on the primary glasses by two short tabs that extend sidewardly so as to rest on the temple members of the primary glasses. No clips or clamps are involved, so the auxiliary glasses simply "drop in" behind the regular glasses, avoiding damage to either the primary or the auxiliary lenses. This configuration makes the auxiliary glasses less obtrusive than conventional clip-on lenses.

Moreover, the auxiliary glasses can be formed inexpensively in one piece of molded plastic, and can be sold without a prescription.

It is apparent that numerous innovations for eyeglasses have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a snap-on, flip-up pair of eyeglasses for mounting over and modifying a conventional pair of eyeglasses that avoids the disadvantages of the prior art.

ANOTHER OBJECT of the present invention is to provide a snap-on, flip-up pair of eyeglasses for mounting over and modifying a conventional pair of eyeglasses that is simple to use.

BRIEFLY STATED, STILL ANOTHER OBJECT of the present invention is to provide a snap-on, flip-up pair of eyeglasses mounting over and modifying a conventional pair of eyeglasses. A pair of lenses are engaged by a frame having a bridge and mounting apparatus snap-on and flip-up mounts the frame over the conventional pair of glasses, while maintaining the snap-on, flip-up pair of eyeglasses a sufficient distance from the conventional pair of eyeglasses to prevent damage therebetween when the snap-on, flip-up pair of eyeglasses is snapped on/off or flipped up/down. The mounting apparatus includes a pair of arms extending rearwardly from the bridge of the frame and terminating in a pair of fingers that depend therefrom and which are spaced-apart from each other so as to form a resilient space therebetween that snappingly receives the bridge of the conventional pair of eyeglasses so as to allow the snap-on, flip-up pair of eyeglasses to snap-on/off and flip-up/down over the conventional pair of eyeglasses.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

Figure 1:
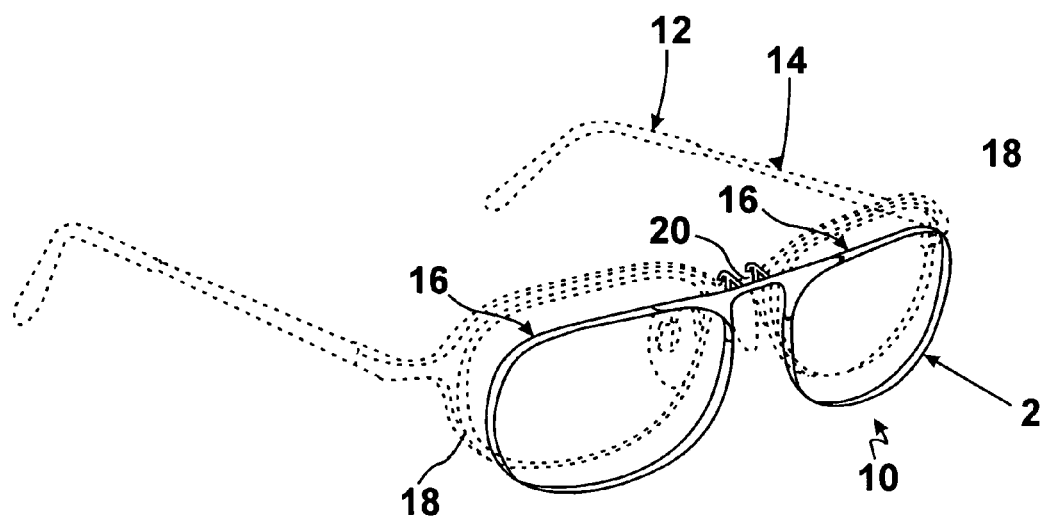
FIG. 1 is a diagrammatic perspective view of the present invention mounted over a conventional pair of eyeglasses.

LIST OF REFERENCE NUMERALS UTILIZED IN THE DRAWING 10 snap-on, flip-up pair of eyeglasses of present invention for mounting over and modifying conventional pair of eyeglasses 12
12 conventional pair of eyeglasses
14 frame of conventional pair of eyeglasses 12
16 pair of lenses of conventional pair of eyeglasses 12
18 pair of lens-enclosing portions of frame 14 of conventional pair of eyeglasses 12
20 bridge of frame 14 of conventional pair of eyeglasses 12
22 frame
24 pair of lenses for overlying pair of lenses 16 of conventional pair of eyeglasses 12, respectively
26 mounting apparatus for snap-on and flip-up mounting of frame 22 over conventional pair of glasses 12, while maintaining frame 22 sufficient distance from frame 14 of conventional pair of eyeglasses 12 to prevent damage therebetween when snap-on, flip-up pair of eyeglasses 10 is snapped on/off or flipped up/down and for maintaining pair of lenses 24 sufficient distance from pair of lenses 16 of conventional pair of eyeglasses 22 to prevent damage therebetween when snap-on, flip-up pair of eyeglasses 10 is snapped on/off or flipped up/down
28 pair of lens-enclosing portions of frame 22 for overlying pair of lens-engaging portions 18 of frame 14 of conventional pair of eyeglasses 12
30 bridge of frame 22 for overlying bridge 20 of frame 14 of conventional pair of eyeglasses 12
32 pair of arms of mounting apparatus 26
34 pair of fingers of each arm of pair of arms 32 of mounting apparatus 26
36 resilient space between pair of fingers 34 of each arm of pair of arms 32 of mounting apparatus 26 for snappingly receiving bridge 20 of frame 14 of conventional pair of eyeglasses 12 so as to allow frame 22 to snap-on/off and flip-up/down over conventional pair of eyeglasses 12

DETAILED DESCRIPTION OF THE INVENTION

Referring now to the figures in which like numerals indicate like parts, and particularly to FIG. 1, which is a diagrammatic perspective view of the present invention mounted over a conventional pair of eyeglasses, the snap-on, flip-up pair of eyeglasses of the present invention is shown generally at 10 for mounting over and modifying a conventional pair of eyeglasses 12. The conventional pair of eyeglasses 12 has a frame 14 and a pair of lenses 16. The frame 14 of the conventional pair of eyeglasses 12 has a pair of lens-enclosing portions 18 and a bridge 20. The bridge 20 of the frame 14 connects the pair of lens-engaging portions 18 of the frame 14 to each other. The pair of lenses 16 are engaged by the pair of lens-engaging portions 18 of the frame 14.

Figure 2:
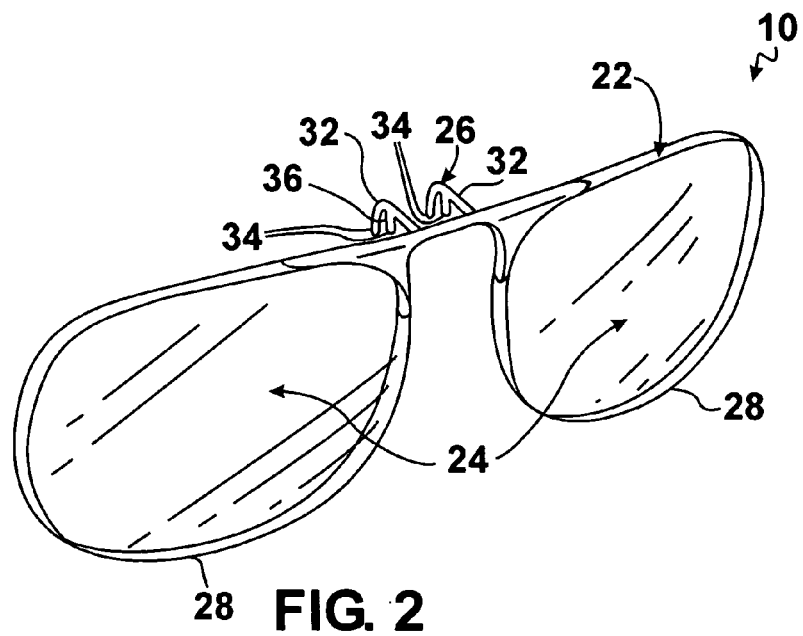
FIG. 2 is a diagrammatic perspective view of the present invention identified by ARROW 2 in FIG. 1.
Figure 3:
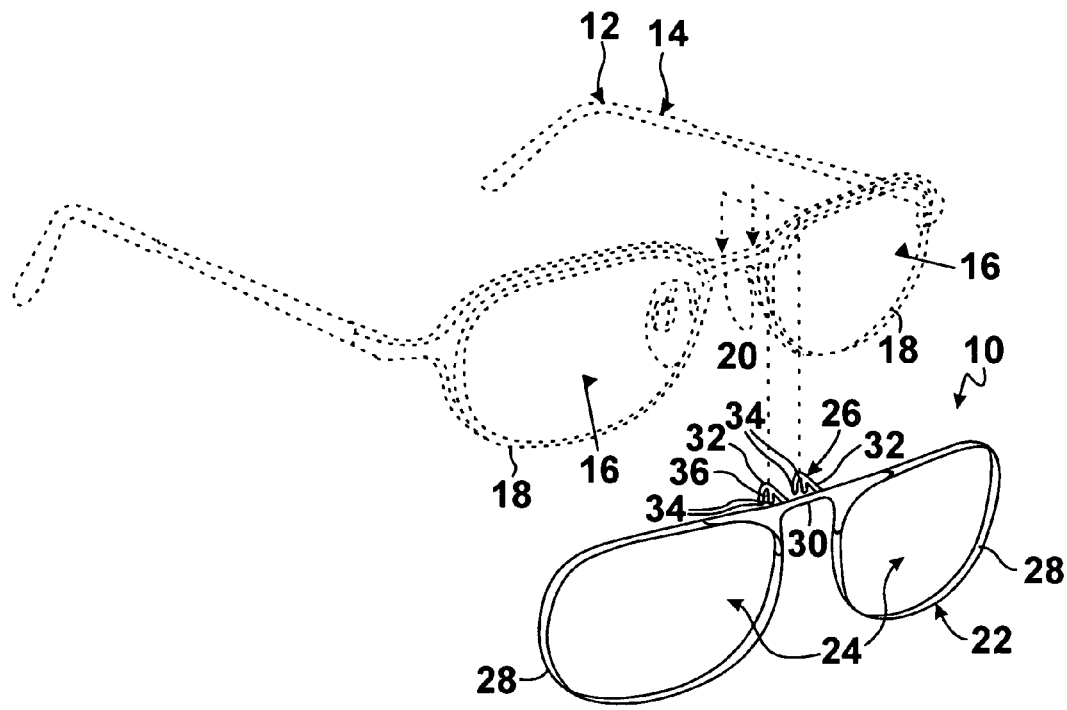
FIG. 3 is an exploded diagrammatic perspective view of the present invention being snapped on a conventional pair of eyeglasses.
Figure 4:
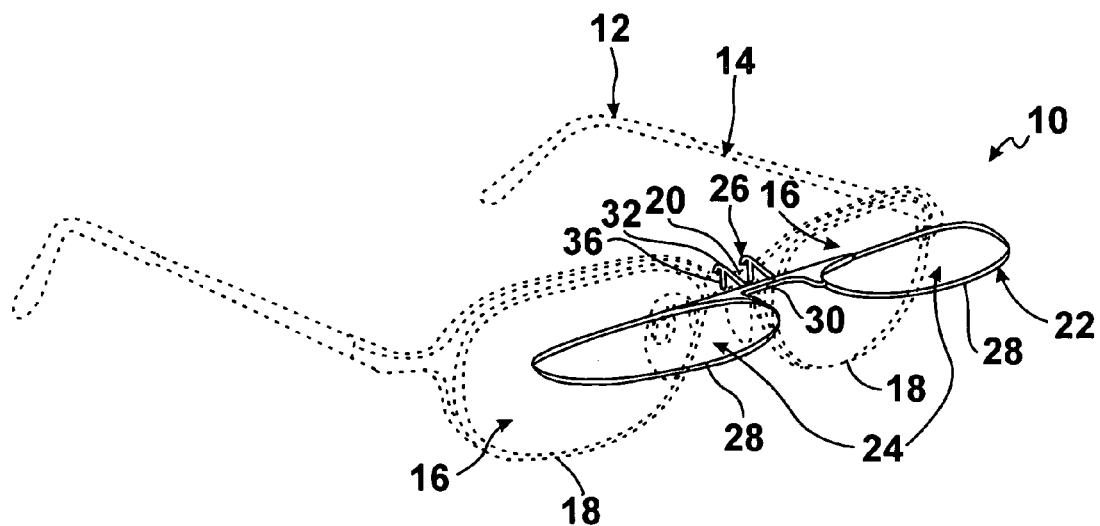
FIG. 4 is a diagrammatic perspective view of the present invention being flipped up on a conventional pair of eyeglasses.

The configuration of the snap-on, flip-up pair of eyeglasses 10 can best be seen in FIGS. 2–4, which are, respectively, a diagrammatic perspective view of the present invention identified by ARROW 2 in FIG. 1, an exploded diagrammatic perspective view of the present invention being snapped on a conventional pair of eyeglasses, and, a diagrammatic perspective view of the present invention being flipped up on a conventional pair of eyeglasses, and as such, will be discussed with reference thereto.

The snap-on, flip-up pair of eyeglasses 10 comprises a frame 22, a pair of lenses 24, and mounting apparatus 26.

The pair of lenses 24 are engaged by the frame 22. The mounting apparatus 26 is for snap-on and flip-up mounting of the frame 22 over the conventional pair of glasses 12, while maintaining the frame 22 a sufficient distance from the frame 14 of the conventional pair of eyeglasses 12 to prevent damage therebetween when the snap-on, flip-up pair of eyeglasses 10 is snapped on/off or flipped up/down and for maintaining the pair of lenses 24 a sufficient distance from the pair of lenses 16 of the conventional pair of eyeglasses 22 to prevent damage therebetween when the snap-on, flip-up pair of eyeglasses 10 is snapped on/off or flipped up/down.

The frame 22 comprises a pair of lens-enclosing portions 28 and a bridge 30. The pair of lens-engaging portions 28 of the frame 22 are for overlying the pair of lens-engaging portions 18 of the frame 14 of the conventional pair of eyeglasses 12. The bridge 30 of the frame 22 connects the pair of lens-enclosing portions 28 of the frame 22 to each other and is for overlying the bridge 20 of the frame 14 of the conventional pair of eyeglasses 12.

The pair of lenses 24 are engaged by the pair of lens-enclosing portions 28 of the frame 22, respectively, and are for overlying the pair of lenses 16 of the conventional pair of eyeglasses 12, respectively.

The mounting apparatus 26 comprises a pair of arms 32. The pair of arms 32 of the mounting apparatus 26 are identical to each other, are parallel to each other, and are spaced-apart from each other.

Each arm 32 of the mounting apparatus 26 extends rearwardly from the bridge 30 of the frame 22 and terminates in a pair of fingers 34. The pair of fingers 34 of each arm 32 of the mounting apparatus 26 depend therefrom, and are spaced rearwardly from the bridge 30 of the frame 22 the sufficient distance.

The pair of fingers 34 of each arm 32 of the mounting apparatus 26 are parallel to each other and are spaced-apart from each other so as to form a resilient space 36 therebetween. The resilient space 36 between the pair of fingers 34 of each arm 32 of the mounting apparatus 26 are for snappingly receiving the bridge 20 of the frame 14 of the conventional pair of eyeglasses 12 so as to allow the frame 22 to snap-on/off and flip-up/down over the conventional pair of eyeglasses 12.

It will be understood that each of the elements described above, or two or more together, may also find a useful application in other types of constructions differing from the types described above.

While the invention has been illustrated and described as embodied in a snap-on, flip-up pair of eyeglasses for mounting over and modifying a conventional pair of eyeglasses, however, it is not limited to the details shown, since it will be understood that various omissions, modifications, substitutions and changes in the forms and details of the assembly illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A snap-on, flip-up pair of eyeglasses for mounting over and modifying a conventional pair of eyeglasses, wherein the conventional pair of eyeglasses has a frame and a pair of lenses, wherein the frame of the conventional pair of eyeglasses has a pair of lens-enclosing portions and a bridge, wherein the bridge of the frame connects the pair of lens-engaging portions of the frame to each other, and wherein the pair of lenses are engaged by the pair of lens-engaging portions of the frame, said pair of eyeglasses comprising:
   a) a frame;
   b) a pair of lenses; and
   c) mounting apparatus;
   wherein said pair of lenses are engaged by said frame; and
   wherein said mounting apparatus is for snap-on and flip-up mounting of said frame over the conventional pair of glasses, while maintaining said frame a sufficient distance from the frame of the conventional pair of eyeglasses to prevent damage therebetween when said snap-on, flip-up pair of eyeglasses is snapped on/off or flipped up/down and for maintaining said pair of lenses a sufficient distance from the pair of lenses of the conventional pair of eyeglasses to prevent damage therebetween when said snap-on, flip-up pair of eyeglasses is snapped on/off or flipped up/down;
   wherein said frame comprises a bridge:
   wherein said mounting apparatus comprises a pair of arms;
   wherein each arm of said mounting apparatus terminates in a pair of fingers;
   wherein said pair of fingers of each arm of said mounting apparatus are spaced-apart from each other so as to form a resilient space therebetween; and
   wherein said resilient space between said pair of fingers of each arm of said mounting apparatus are for snappingly receiving the bridge of the frame of the conventional pair of eyeglasses so as to allow said frame to snap-on/off and flip-up/down over the conventional pair of eyeglasses.

2. The pair of eyeglasses as defined in claim 1, wherein said frame comprises a pair of lens-enclosing portions;
   wherein said pair of lens-engaging portions of said frame are for overlying the pair of lens-engaging portions of the frame of the conventional pair of eyeglasses;
   wherein said bridge of said frame connects said pair of lens-enclosing portions of said frame to each other; and
   wherein said bridge of said frame is for overlying the bridge of the frame of the conventional pair of eyeglasses.

3. The pair of eyeglasses as defined in claim 2, wherein said pair of lenses are engaged by said pair of lens-enclosing portions of said frame, respectively; and
   wherein said pair of lenses are for overlying the pair of lenses of the conventional pair of eyeglasses, respectively.

4. The pair of eyeglasses as defined in claim 1, wherein said pair of arms of said mounting apparatus are identical to each other;
   wherein said pair of arms of said mounting apparatus are parallel to each other; and
   wherein said pair of arms of said mounting apparatus are spaced-apart from each other.

5. The pair of eyeglasses as defined in claim 1, wherein each arm of said mounting apparatus extends rearwardly from said bridge of said frame.

6. The pair of eyeglasses as defined in claim 1, wherein said pair of fingers of each arm of said mounting apparatus depend therefrom.

7. The pair of eyeglasses as defined in claim 1, wherein said pair of fingers of each arm of said mounting apparatus are spaced rearwardly from said bridge of said frame said sufficient distance.

8. The pair of eyeglasses as defined in claim 1, wherein said pair of fingers of each arm of said mounting apparatus are parallel to each other.

* * * * *